United States Patent [19]

Gosling et al.

[11] 4,096,420

[45] Jun. 20, 1978

[54] CONTROL CIRCUIT FOR A BRUSHLESS D.C. MOTOR

[75] Inventors: Alexander Benett Gosling; Barrie Ewart Mealing, both of Cambridge, England

[73] Assignee: Danfoss A/S, Nordborg, Denmark

[21] Appl. No.: 702,494

[22] Filed: Jul. 6, 1976

[51] Int. Cl.² .............................................. H02K 29/02
[52] U.S. Cl. ................................... 318/254; 318/439
[58] Field of Search ................. 318/138, 254, 439; 336/110; 323/89 R

[56] References Cited

U.S. PATENT DOCUMENTS

| | | | |
|---|---|---|---|
| 3,594,624 | 7/1971 | Lueder | 318/254 |
| 3,648,117 | 3/1972 | Yamamoto et al. | 336/110 X |
| 3,873,898 | 3/1975 | Muller | 318/138 |

*Primary Examiner*—Robert K. Schaefer
*Assistant Examiner*—John J. Feldhaus

[57] ABSTRACT

The invention relates to a control circuit for a brushless self-starting D.C. motor of the type which has a permanent magnet rotor and a stator coil, a magnetic field-dependent component subjected to the rotor field to determine the rotary position, and a controllable electronic servo-element lying in series with the stator coil at the D.C. source, the servo-element controlling the flux through the stator coil in dependence on the rotary position of the rotor, the magnetic field-dependent parameter changes of the magnetic field-dependent component being convertible to a control signal for the servo-element. The control circuit is characterized by including an oscillator with an LC resonance circuit of which the inductance is formed by the magnetic field-dependent component in the form of a sensing coil (10) with a core. The circuit includes a modulator for modulating the oscillation of the oscillator in response to the induction brought about in the sensing coil by the torot field. The control signal for the servo-element is derivable from the modulated oscillator oscillation, and that the oscillator frequency is considerably higher than the rotor speed. The oscillating condition of the oscillator is responsive to the induction in the sensing coil, and the control signal is derivable from the intermittent oscillator oscillation.

8 Claims, 9 Drawing Figures

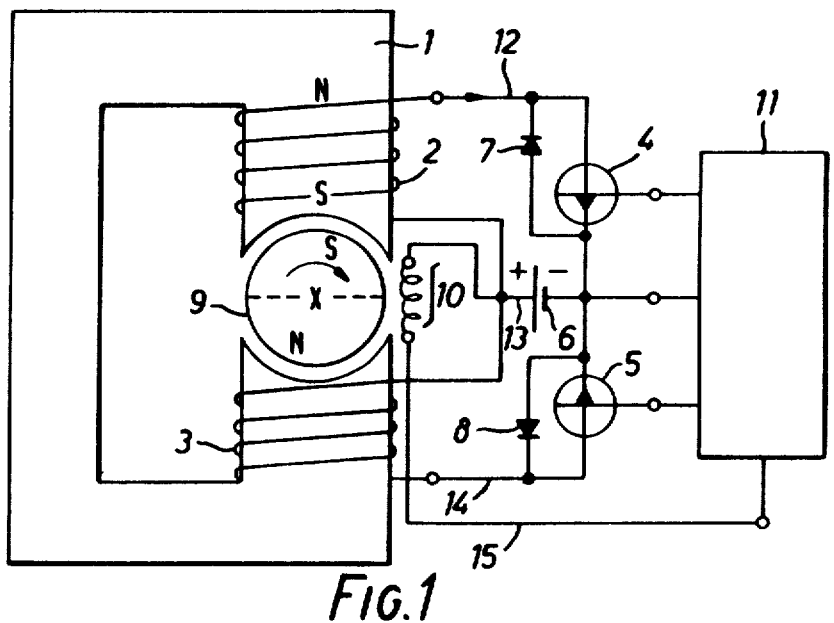
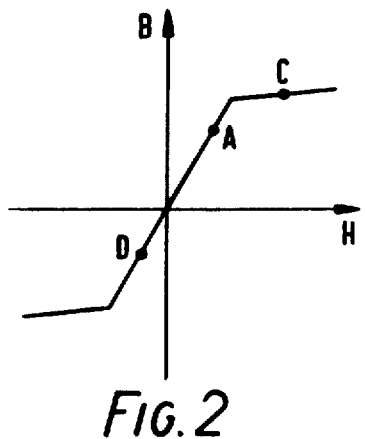
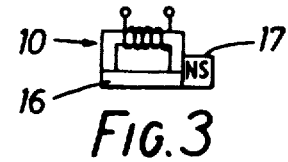
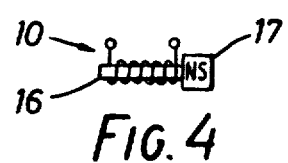
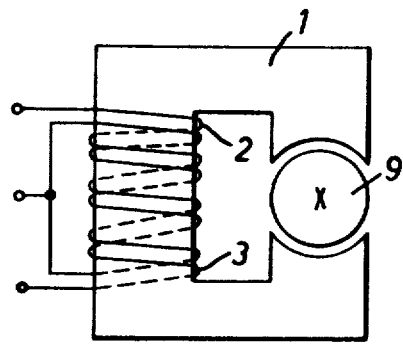
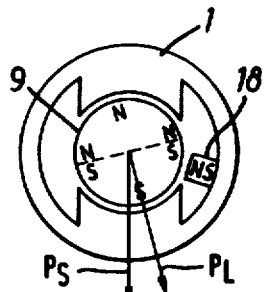
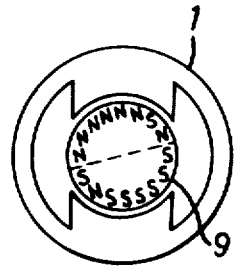

CONTROL CIRCUIT FOR A BRUSHLESS D.C. MOTOR

The invention relates to a control circuit for a brushless self-starting D.C. motor comprising a permanent magnet rotor and a stator coil, a magnetic field-dependent component subjected to the rotor field to determine the rotary position, and a controllable electronic servo-element lying in series with the stator coil at the D.C. source, the servo-element controlling the flux through the stator coil in dependence on the rotary position of the rotor, the magnetic field-dependent parameter changes of the magnetic field-dependent component being convertible to a control signal for the servo-element.

A control circuit of this kind for a brushless D.C. motor is known, wherein a Hall generator is used as magnetic field-dependent component so that, in contrast with a sensing coil where no voltage is induced by the rotor field when the rotor is stationary, starting is made independent of the rotary speed. By way of a control circuit comprising a plurality of transistors, the Hall voltage controls the servo-element that is in series with the stator coil. However, by reason of its numerous terminals, a Hall generator involves additional wiring expense for the motor and the control circuit as well as between same, even if there is only one stator coil. The Hall generator requires a constant current supply, the Hall current, which reduces the overall efficiency. Further, a Hall generator is dependent on temperature, which can result in displacement of the switching point of the servo-element, a transistor operated as a switch, and thus to a reduction in the motor efficiency. The efficiency of the control circuit, the D.C. motor and the total required expense play a decisive role in many cases, particularly when using the D.C. motor for refrigerators which, in relation to their useful life, are frequently in operation and are made in large numbers, particularly in the case of accumulator-driven refrigerators for leisure use, e.g., in caravans, boats, holiday cottages, etc., but also for battery-operated household appliances.

Brushless D.C. motors with more than to stator coils are also known for control circuits. In these the magnetic alternating field of the oscillating coil of a continuously oscillating LC-oscillator alternately induces a control voltage in control coils which are disposed in the control circuit of a stator coil and are distributed over the periphery of the stator, so that a metallic segment rotating with the rotor consecutively couples the magnetic field of the oscillating coil to all the control coils or shields it from all the control coils except one. This involves a still higher expense with regard to wiring of the control coils and their accommodation at the stator as well as the construction of the coupling or screening means.

The invention is based on the object of providing a control circuit of the aforementioned kind which has a simple construction and a high efficiency.

According to the invention, this object is achieved in that the control circuit comprises an oscillator with an LC resonance circuit of which the inductance is formed by the magnetic field-dependent component in the form of a sensing coil with a core, that the oscillation of the oscillator is modulatable in response to the induction brought about in the sensing coil by the rotor field, that the control signal for the servo-element is derivable from the modulated oscillator oscillation, and that the oscillator frequency is considerably higher than the rotor speed.

This sensing coil very sensitively responds to the magnitude of the rotor field by a change in its inductance and quality, irrespective of the rotary speed of the rotor. The change in oscillator oscillation can be very reliably determined so as to derive therefrom a control signal with alternating amplitude for effecting the switching on and off of the servo-element synchronously with rotation of the rotor. On a fall in the amplitude of the oscillation of the oscillator, its energy consumption is reduced correspondingly. The efficiency of the control circuit is increased to the same extent. The sensing coil is comparatively insensitive to temperature variations so that no fluctuations in the rotary field of the stator that might influence the efficiency of the motor can occur as a result of temperature variations. Special coupling or screening means and control coils are avoided. In order to connect the sensing coil that is fixed to the stator, only one terminal for the sensing coil has to be led out of the motor. The other terminal of the sensing coil can be internally connected to the motor terminal for the D.C. source.

It is favorable if the oscillating condition of the oscillator can be met in response to the induction occasioned in the sensing coil and the control signal is derivable from the intermittent oscillator oscillation. Starting and stopping of the oscillator oscillation can be determined even more reliably so as to derive the control signal therefrom. During the intervals between oscillations of the oscillator, its energy consumption is still further reduced, which again results in an increase in the efficiency.

Preferably, the core of the sensing coil is saturatable by the magnetic field of the rotor. This results in very intensive changes in the sensing coil inductance and thus a correspondingly marked starting and stopping point for the oscillator oscillation.

At least a part of the core of the sensing coil should be of ferrite. Ferrite can be saturated with comparatively little flux so that one obtains a sudden parameter change for the sensing coil when there is a change in its flux. Accordingly, even a weak rotor field can bring about this change.

It is also favorable if the core of the sensing coil is premagnetized. In this way a small amount of additional flux suffices to saturate the core. Further, this will ensure that the core is saturated only by an additional flux of the one polarity but not of the other, so that there will be a clear indication of the rotary angle.

To bring about the premagnetization, the core of the sensing coil may comprise a permanent magnet. This saves energy for maintaining a premagnetizing current.

Preferably, provision is made for the stator to comprise only a second coil lying in series with a second servo-element at the D.C. source and for the second servo-element to be likewise controllable by control signals derived from the parameter changes of the sensing coil. This number of stator coils is a particularly favorable compromise between the achievable efficiency and expense. As far as the motor is concerned, a single additional coil is adequate, which ensures a more uniform torque and thus a higher efficiency, and a single additional motor terminal for controlling the second coil if a connection of the stator coil that is connected to the D.C. source is connected to a terminal of the sensing coil.

The servo-elements may be power transistors operated as switches. In contrast with, say, thyristors, which could theoretically also be used, the control energy for transistors is less because the quenching means are dispensed with. A transistor operated as a switch can transmit higher outputs in relation to its permissible energy loss. The power transistors can therefore have correspondingly small dimensions.

Downstream of the oscillator, there may be a demodulator which converts the intermittent oscillator oscillation to a rectangular signal. A rectangular signal effects more rapid switching over of the servo-element at a defined instant of time.

The demodulator may comprise a rectifier arrangement and a smoothing condenser. This results in a particularly simple construction of the demodulator.

Preferably, the rectangular signal can be fed to both power transistors but to one of them with a 180° phase displacement. In this way one ensures that the two servo-elements operate in precisely opposite cycles and the stator coils are therefore also switched on and off in opposite cycles but nevertheless synchronously with the stator rotation. The power transistors are very rapidly switched over so that commutation losses are avoided.

A reversing stage effecting the 180° phase displacement may be disposed between the demodulator and the power transistors. A reversing stage represents a particularly simple way of producing a 180° phase shift.

It is favorable if the reversing stage comprises two series connected transistors from the outputs of which the 180° phase-displaced rectangular signals are derivable. In this way one obtains an amplification in the output of the rectangular control signal for both power transistors.

Each power transistor may be preceded by a preamplifying transistor. This results in reliable uncoupling between the control circuit and the power section. For this it is favorable if a current-limiting resistance is disposed between each power transistor and pre-amplifying transistor. This limits the starting current of the motor so that one can use weaker and therefore cheaper power transistors.

It is also favorable if a diode is connected in anti-parallel with each power transistor. In this way it is possible to increase the efficiency by returning to the D.C. source through one of the stator coils and the associated diode the energy that is stored in the other stator coil after blocking of the associated power transistor.

Further, it is advantageous if the stator coils are wound in close juxtaposition and are identical. This gives a higher coupling factor between the coils and thus a better return flow to the D.C. source through one of the coils of the energy stored in the other coil that is switched off, and this again contributes to an increase in the efficiency.

The control signal may be interruptable in response to a physical quantity. Without considerable additional expense, this permits switching on and off of the motor when the physical quantity exceeds or falls short of a limiting value, the physical quantity being for example the temperature of the motor itself so as to protect it and the energy source from overloading, or the ambient temperature so as to control same by a heating or refrigerating unit driven by the motor.

Thus, the control circuit may comprise a blocking circuit in the path of the control signal and actuatable in response to the physical quantity. When the blocking circuit permits the control signal to pass, the motor can start; otherwise it remains stationary.

Preferably, provision is made for the static magnetic distribution between the rotor and stator in the peripheral direction to be selected so that the pole axis of the rotor when stationary forms an acute angle with the pole axis of the stator, and for the stationary position of the rotor to be so selected in relation to a working element which is driven by the motor and which executes alternate operative and idling strokes that the motor starts at no load, e.g., during a suction stroke of the compressor of a refrigerator. In this way a particularly low starting current will be adequate.

To achieve the magnetic distribution allowing self-starting, the air gap between the stator and rotor can differ in the peripheral direction and/or a permanent magnet may be provided near the rotor periphery and/or an unsymmetrical permanent magnet pole distribution may be provided in the rotor.

The drawings diagrammatically illustrate preferred examples. In the drawings:

FIG. 1 illustrates a brushless D.C. motor with associated control circuit;

FIG. 2 shows the BH characteristic of the sensing coil;

FIGS. 3 and 4 show different embodiments of the core for the sensing coil;

FIG. 5 shows an embodiment of the motor with bifilar-wound stator coils;

FIGS. 6 and 7 illustrate different embodiments of the stator and rotor for achieving a stable holding point for the rotor when the stator coil is switched off;

Figure 8:
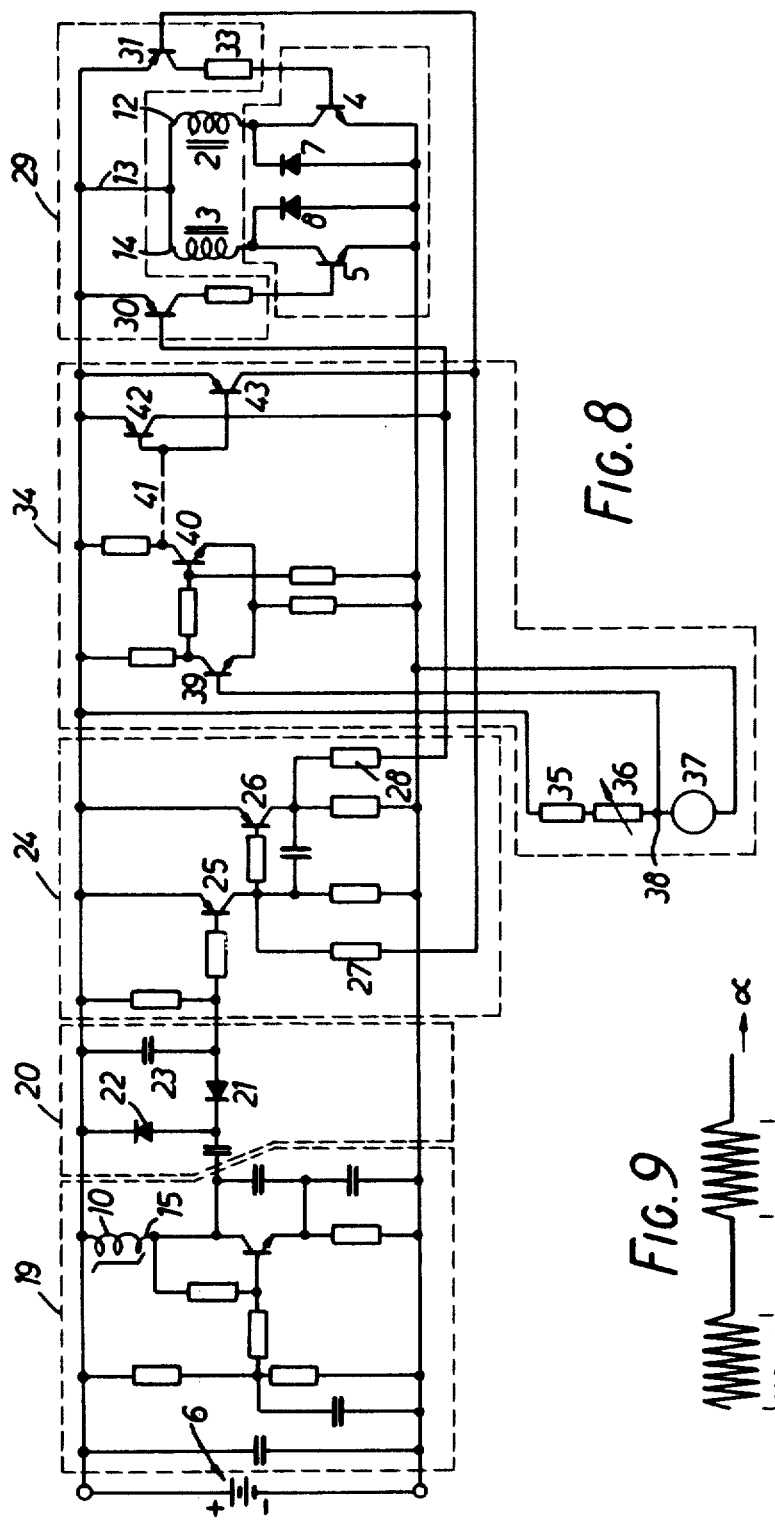
FIG. 8 is a diagram of the control circuit.

In the preferred embodiment of the brushless D.C. motor of FIG. 1, the stator 1 is provided with two coils 2 and 3. Each coil 2, 3 is in series at a D.C. source 6 with a controllable electric servo-element 4,5 in the form of a power transistor operated as a switch. A diode 7, 8 is connected in anti-parallel with each servo-element 4, 5. The rotary position of the rotor 9 in the form of a permanent magnet is determined by means of a sensing coil 10 which is disposed in the vicinity of the rotor 9 and has a premagnetized saturatable core. The sensing coil 10 is on the one hand connected to the same pole of the D.C. source 6 with which the coils 2 and 3 are directly connected and on the other hand it is connected to a control unit 11 so that only four leads 12, 13, 14 and 15 will suffice for the motor.

Special provision is made, as hereinafter described, for the rotor 9 to assume the illustrated rest position when the coils 2, 3 are de-energized; in this rest position, the pole axis of the rotor includes an acute angle with the pole axis of the stator 1. The field of the rotor 9 in this position of the rotor 9 results in such an inductance in the core of the sensing coil 10 that the control unit supplies the servo-element 4 with a control signal. The servo-element 4 is thereupon controlled through and a current flows in the conduit 12 in the direction indicated by the arrow. The resulting South pole S of the coil 2 repels the South pole S of the rotor 9 so that the rotor 9 begins to rotate in the direction indicated by the curved part. After half a revolution of the rotor 9, the inductance in the core of the sensing coil 10 has changed such that the control signal disappears at the control input of the servo-element 4 and is instead applied to the control input of the servo-element 5. As a result, the current through the servo-element 4 is interrupted, the coil 2 is de-energized and a current flows through the coil 3. The lower pole shoe of the stator therefore becomes so magnetized that its South pole faces the South pole S of the rotor and imparts to the rotor 9 a further impulse in the same rotary sense. Each time a servo-element 4 or 5 becomes blocked, the series-connected coil 2 or 3 can become discharged in the manner of a transformer into the D.C. source 6 by way of the other coil 3 or 2, respectively, and the appropriate diode 8 or 7, respectively. In this way one obtains a higher efficiency.

During each rotation of the rotor 9, these procedures are repeated.

According to FIG. 2, the core of the sensing coil 10 is premagnetized up to the point A on the BH characteristic curve and the core material is so selected that the BH curve is practically rectangular. A comparatively small additional flux is therefore sufficient to saturate the core to a stage at which the inductance of the coil is practically zero. This sudden change in inductance in the one or other direction is utilized in the control unit 11 for deriving the control signals for the servo-elements 4 and 5. The premagnetization ensures that the core is brought to (positive) saturation only once during each rotor revolution up to the point C and becomes unsaturated only once up to the point D. A high inductance for the sensing coil 10 results in a control of one of the control elements 4, 5 with simultaneous blocking of the other and a low inductance of the sensing coil 10 results in control of the other control element with simultaneous blocking of the one control element.

The core of the sensing coil 10 can, in accordance with FIGS. 3 and 4, have one part 16 of ferrite and a permanent magnet 17 for premagnetization. The sensing coil 10 is only diagrammatically illustrated in FIG. 1. In practice, it is arranged relatively to the rotor 9 so that it is magnetized up to the point C or D in that position of the rotor where the pole axes of the rotor and stator come together. The axis of the sensing coil 10 may be directed towards the rotor, e.g., radially or towards its end.

The stator coils 2, 3 can be bifilar in accordance with FIG. 5, i.e., wound in close juxtaposition and identical. In this way one obtains a closer magnetic coupling between the coils 2, 3 and thus a better return flow of the magnetic energy stored in the coils after they are switched off, this, in turn, leading to an increase in the motor efficiency.

To achieve a stable holding point when the coils, 2, 3 are de-energized, i.e., when the motor is switched off, the stator according to FIG. 6 may comprise a permanent magnet 18 which is arranged to that the pole axis $P_S$ of the stator 1 includes an acute angle with the pole axis $P_L$ of the rotor, which may also have several permanent magnets. In this way it is ensured that the coil which is first energized when the motor is switched on immediately exerts a torque on the rotor 9 and the motor starts by itself.

The same can be achieved according to FIG. 7 by means of a corresponding unsymmetrical distribution of the north and south poles of the rotor 9. Another possibility for a corresponding unsymmetrical distribution of the induction in the air gap of the motor consists of allowing the air gap to converge or diverge in the peripheral direction. These features may also be combined.

Figure 9:
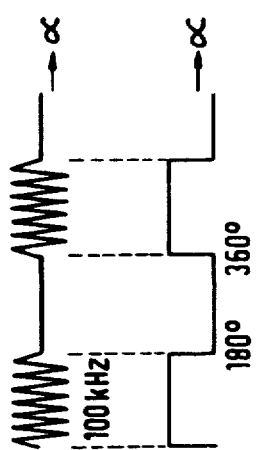
FIG. 9 shows the course of the control signal in response to the rotary angle of the rotor before and after demodulation.

A circuit diagram for the control circuit is represented in FIG. 8. An oscillator 19 contains a frequency-determining element in the form of an LC resonant circuit of which the inductance and quality is determined by the sensing coil 10. In response to these parameters of the sensing coil 10, particularly its inductance but also its quality which, in turn, depend on the rotary angle α of the rotor, the feedback factors of the transistor-oscillator are so selected that the oscillations of the oscillator occur or stop as shown at the top of FIG. 9. This means that during half a turn of the rotor 9 the oscillator oscillates with a frequency of about 100 kHz and during the following half turn of the rotor the oscillations stop. It is also possible to design the oscillator 19 so that the amplitude and frequency of the oscillations gradually or suddenly increase and drop off during one revolution of the rotor, without the oscillations stopping altogether.

In a demodulator 20 which is disposed downstream of the oscillator 19 and comprises rectifiers 21, 22 and a smoothing condenser 23, the output signal of the oscillator 19 is converted to a rectangular signal as shown at the bottom of FIG. 9. The impulse sequence frequency of the rectangular signal always corresponds to the rotary speed of the rotor, the oscillator frequency at 100 kHz being considerably higher than the impulse sequence frequency of the rectangular signal or the rotor speed.

Following the demodulator 20 there is a reversing stage 24 with two series connected transistors 25, 26 of which the output signals on the collector side are likewise rectangular but displaced 180° from one another and are each fed through a current limiting resistance 27, 28 to the inputs of a pre-amplifier stage 29.

The pre-amplifier stage 29 contains for each power transistor 4 or 5 a pre-amplifying transistor 30 or 31 in series with a current limiting resistance 32 or 33. By reason of the phase-displaced rectangular signals of the reversing stage 24, the power transistors 4 and 5 are fully controlled through in counter-cycle by way of the pre-amplifying transistors 30 and 31, so that the power transistors alternately apply the two coils 2, 3 to the D.C. source 6.

There is also a blocking circuit 34 between the reversing stage 24 and the pre-amplifier stage 29. This blocking circuit contains a voltage divider consisting of a fixed resistance 35, an adjustable resistance 36 to provide the desired value and a thermistor 37. The voltage occurring at the tapping point 38 of the voltage divider controls, by way of a preliminary stage containing transistors 39, 40 and possibly a further stage indicated by the conduit 41 in broken lines, two parallel output transistors 42, 43 operated as switches which, in turn, have their collector-emitter section lying in a respective control circuit of one of the pre-amplifier transistors 30 and 31. The output signals of the reversing stage 24 can be fully effective or inoperative in the input circuits of the pre-amplifying transistors 30, 31 depending on whether the transistors 42, 43 are blocked or conductive in response to the temperature of the thermistor 37, so that the motor will be stopped or started in accordance with the temperature.

In the preferred use of the motor in a refrigerator, the output signals of the reversing stage 24 are not blocked at a high temperature. On the other hand, at a low temperature the transistors 42 and 43 are conductive so that the pre-amplifying transistors 30 and 31 are blocked because their bases are then practically directly connected to the positive pole of the D.C. voltage source 6. As a result, the motor stops. By including a reversing stage in the conduit 41, the reverse operation can be achieved, for example when using the motor for a pump in a heating installation or the like.

We claim:

1. A control circuit for a brushless self-starting D.C. motor of the type comprising a D.C. source, a permanent magnet rotor and a cooperating stator coil, a saturatable core sensing coil subjected to the rotor field of said rotor to vary the inductance of said sensing coil and thereby determine the rotary position of said rotor, a controllable electronic switch element lying in series with said stator coil and said D.C. source, said switch element controlling the current through said stator coil in dependence on the rotary position of said rotor, said circuit including an oscillator having integral LC oscillation activating elements of which said L element is formed by said sensing coil, modulating means for modulating the oscillation of said oscillator in response to the change in inductance of said sensing coil induced by said rotor field, means for deriving a control signal for said switch element from the modulated oscillator oscillation.

2. A control circuit according to claim 1, characterized in that the oscillating condition of said oscillator is responsive to the change in inductance of said sensing coil, said control signal being derivable from the intermittent oscillator oscillation.

3. A control circuit according to claim 1, characterized in that said core of said sensing coil is pre-magnetized.

4. A control circuit according to claim 3, characterized in that said core of said sensing coil comprises a permanent magnet.

5. A control circuit according to claim 1, characterized in that downstream of said oscillator is a demodulator which converts the intermittent oscillator oscillation to a rectangular signal.

6. A control circuit according to claim 5, characterized in that said demodulator includes a rectifier arrangement and a smoothing capacitor.

7. A control circuit according to claim 5 including a phase reversing stage characterized in that said reversing stage includes two complementary connected transistors from the outputs of which said 180° phase displaced rectangular signals are derivable.

8. A control circuit according to claim 1, including blocking means for interrupting said control signal in response to a physical quantity.

* * * * *